(12) United States Patent
Bobenhausen

(10) Patent No.: US 6,206,048 B1
(45) Date of Patent: Mar. 27, 2001

(54) METHOD FOR REPAIRING A BEAD LOCK HOSE FITTING

(76) Inventor: Larry F. Bobenhausen, 7117 Date Palm Ave. S., St. Petersburg, FL (US) 33707-2013

( * ) Notice: Subject to any disclaimer, the term of this patent is extended or adjusted under 35 U.S.C. 154(b) by 0 days.

(21) Appl. No.: 09/491,231

(22) Filed: Jan. 25, 2000

(51) Int. Cl.$^7$ .................................................. F16L 55/18
(52) U.S. Cl. ............................ 138/97; 138/109; 138/110; 29/516; 285/15
(58) Field of Search ................................. 138/97, 109, 110; 29/890.15, 890.144, 511, 516, 280, 282; 285/15, 89

(56) References Cited

U.S. PATENT DOCUMENTS

| | | | |
|---|---|---|---|
| 3,831,635 | * | 8/1974 | Burton .................................. 138/114 |
| 4,345,624 | * | 8/1982 | Rider .................................... 138/110 |
| 4,850,620 | * | 7/1989 | Puls ...................................... 138/109 |
| 4,927,188 | * | 5/1990 | Sands ..................................... 285/89 |
| 5,105,854 | * | 4/1992 | Cole et al. ............................ 138/109 |
| 5,267,758 | * | 12/1993 | Shah et al. ............................. 29/516 |
| 5,413,147 | * | 5/1995 | Moreiras et al. ..................... 138/109 |
| 5,722,150 | * | 3/1998 | Swanson, III ......................... 29/516 |
| 5,861,200 | * | 1/1999 | Rowley ............................ 29/890.144 |
| 5,899,236 | * | 5/1999 | Coronado et al. ................... 138/109 |
| 5,931,200 | * | 8/1999 | Mulvey et al. ...................... 138/109 |
| 6,016,842 | * | 1/2000 | Rooke ................................. 138/109 |

* cited by examiner

Primary Examiner—James Hook
(74) Attorney, Agent, or Firm—Larson & Larson, P.A.; James E. Larson

(57) ABSTRACT

The steps include cutting an old ferrule and hose from a bead lock fitting, inserting axially a new ferrule having an oval or irregular opening over the bead lock fitting and wedging an edge of the oval opening between two annular flanges on the bead lock fitting. Thereafter, a new hose is inserted axially between the ferrule and bead lock fitting and the ferrule is crimped to the hose to permanently lock it into position over the bead lock fitting.

3 Claims, 8 Drawing Sheets

METHOD FOR REPAIRING A BEAD LOCK HOSE FITTING

1. FIELD OF THE INVENTION

This invention relates to a method for repairing a leaking hose fitting. More particularly, it refers to a method of connecting a hose ferrule to a bead lock fitting prior to crimping a hose to the fitting.

2. BACKGROUND OF THE INVENTION

Mobil air conditioning hose assembly repair systems are known as shown in FIG. 1, hereafter, as prior art. Such a system involves cutting the leaking hose from a bead lock fitting, placing a hose ferrule on a shaft of the bead lock fitting and thereafter placing a retaining ring in a groove formed by two annular flanges around the shaft of the bead lock fitting. This retaining ring is larger than the round opening in one end of the ferrule so the ferrule cannot be pulled off the shaft while an end of a hose is attached to the bead lock fitting and the ferrule is crimped onto the hose. While this prior art repair system accomplishes its intended purpose, it unnecessarily requires a retaining ring which can rust and cause damage to adjacent hoses. A system is needed for attaching a hose to a bead lock fitting without the need for a separate retaining ring.

SUMMARY OF THE INVENTION

My invention is a method of repairing leaks in air conditioning hoses without the need for a retaining ring on the bead lock fitting. The round opening in the ferrule is cut to make it partially oval in shape. After the old ferrule is cut free and the old hose removed, the oval opening on the new ferrule is placed over the groove formed between two annular flanges on the bead lock fitting. The new ferrule is turned about a ½ turn to wedge the narrower portion of the ferrule opening into the groove. Thereafter, the new hose is inserted and the ferrule is crimped to provide a complete repair of the air conditioning hose assembly.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
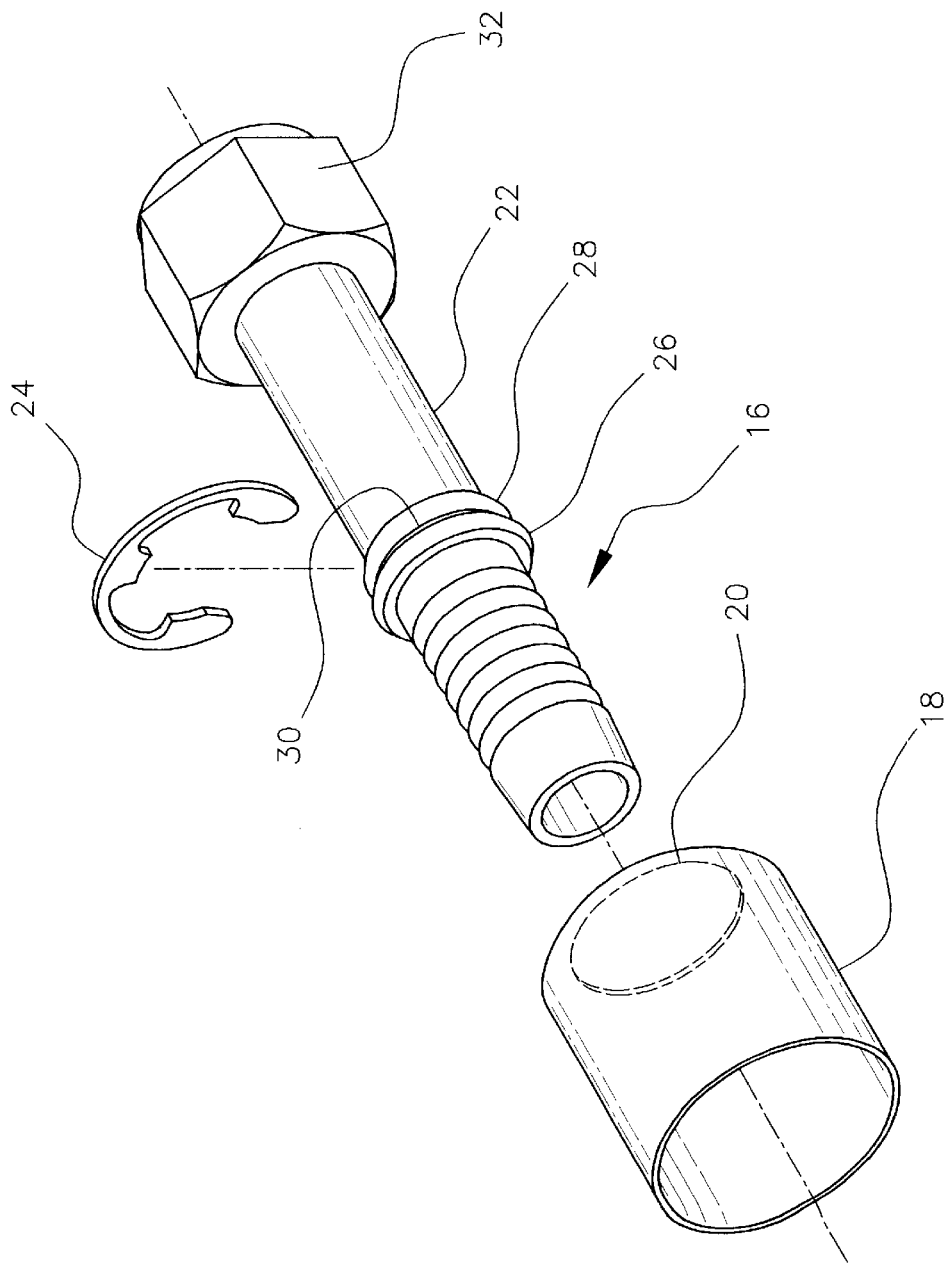
FIG. 1 is an exploded view of a prior art air conditioning hose assembly repair system.

Throughout the following detailed description, the same reference numerals refer to the same elements in all figures.

Figure 2:
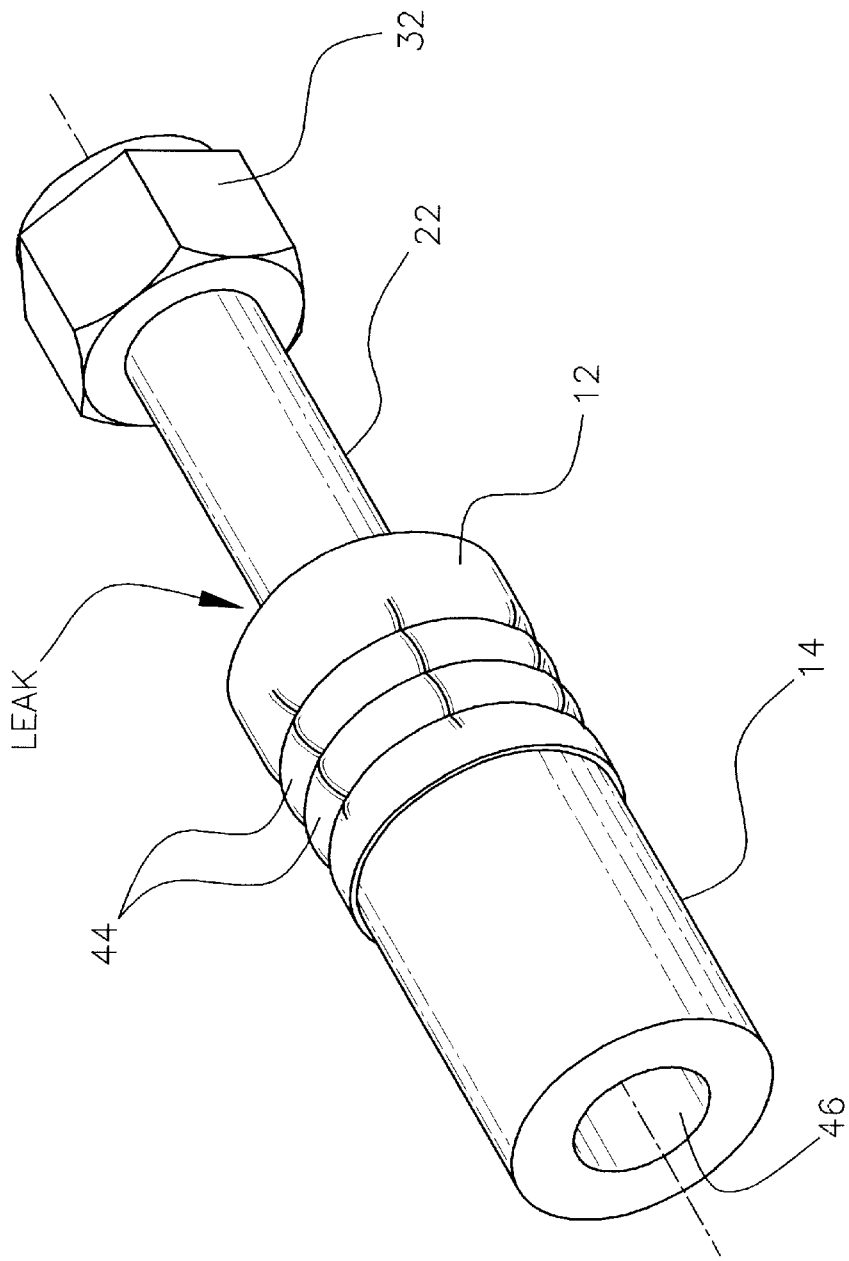
FIG. 2 is a perspective view of a damaged and leaking air conditioning hose assembly.

The prior art method of repairing air conditioning hose assemblies is shown in FIG. 1. After removal of the old ferrule 12 and the leaking hose 14 from the bead lock fitting 16 as shown in FIG. 2, a new ferrule 18 having a round opening 20 at one end is slipped over the shaft 22 of the bead lock fitting 16. A retaining ring 24 is then slipped between flanges 26 and 28 in groove 30. The ferrule 18 can only move backward distal from nut 32 until the retaining ring 24 engages an inner edge of round opening 20. The retaining ring 24 is larger than opening 20 and prevents further backward movement of the new ferrule 18. A new hose 19 is inserted inside the ferrule 18 and the ferrule 18 is crimped to complete the hose assembly.

Figure 3:
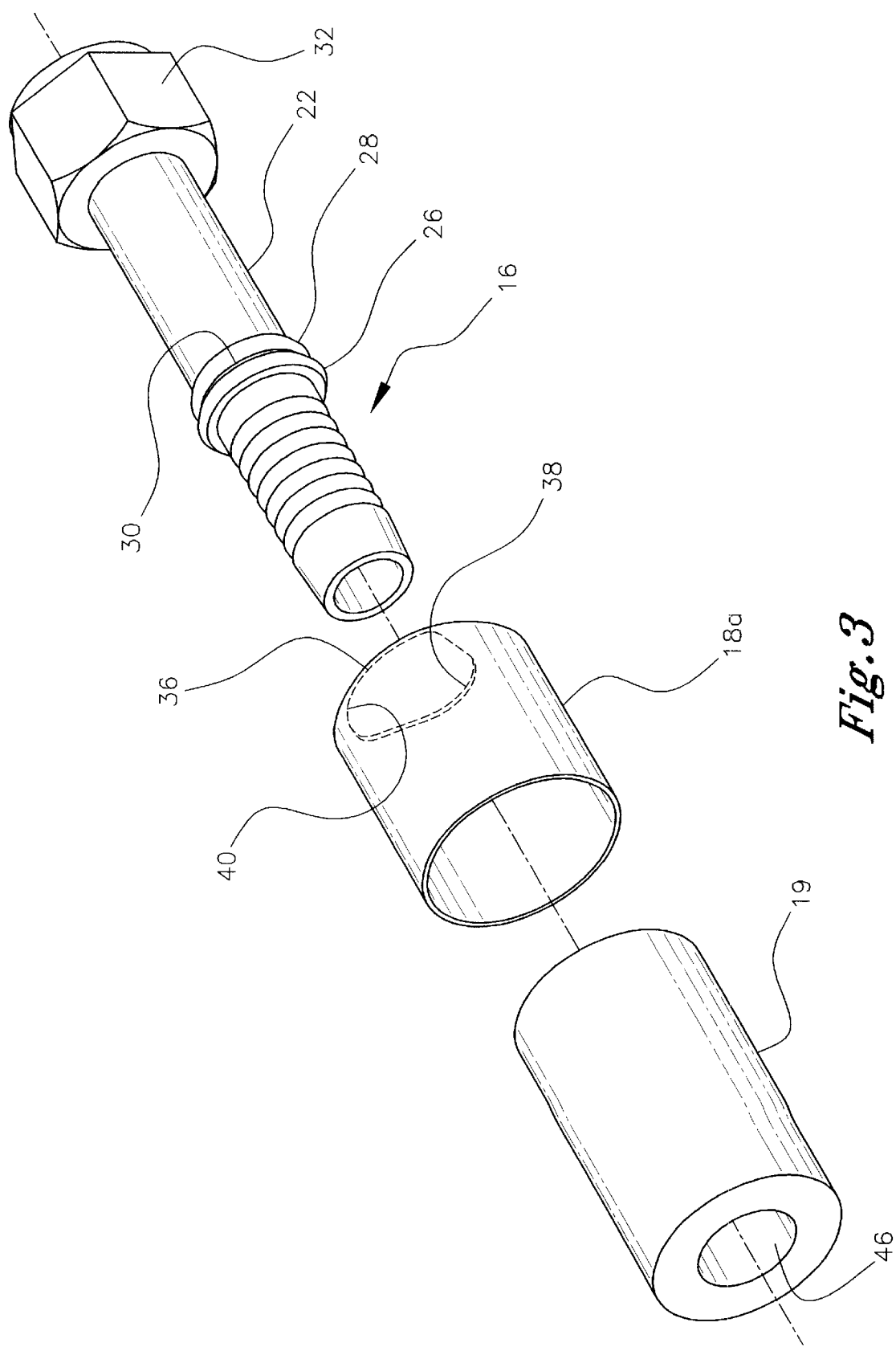
FIG. 3 is an exploded view of the air conditioning hose assembly repair system of this invention.
Figure 4:
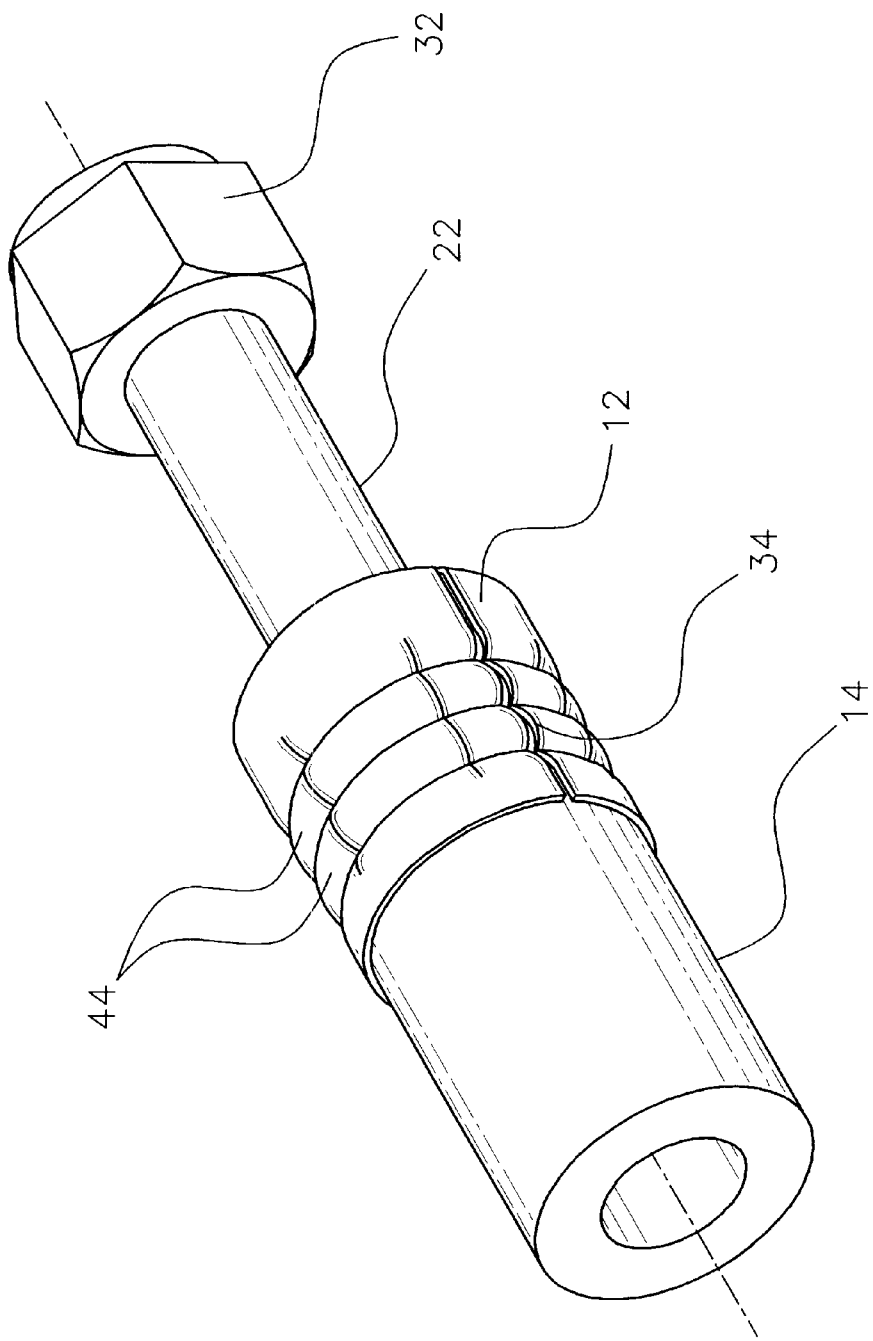
FIG. 4 is a perspective view of the cut ferrule after the first step of the repair method.
Figure 5:
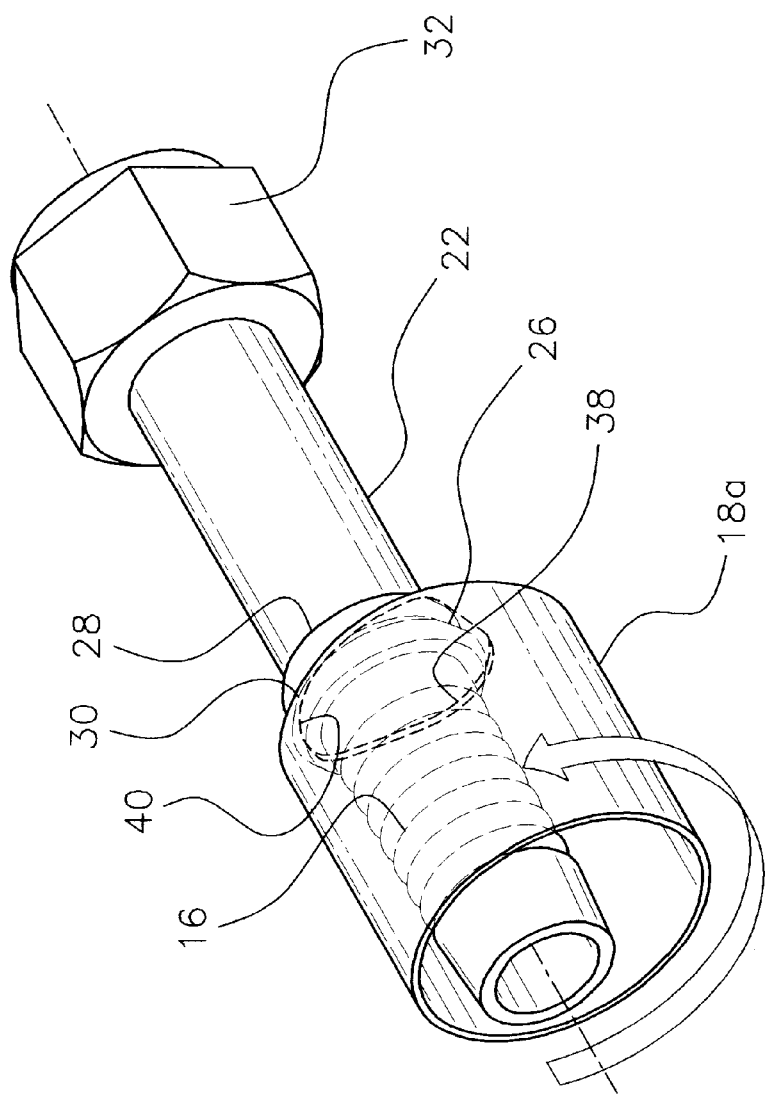
FIG. 5 is a perspective view of the second step of the repair method.
Figure 6:
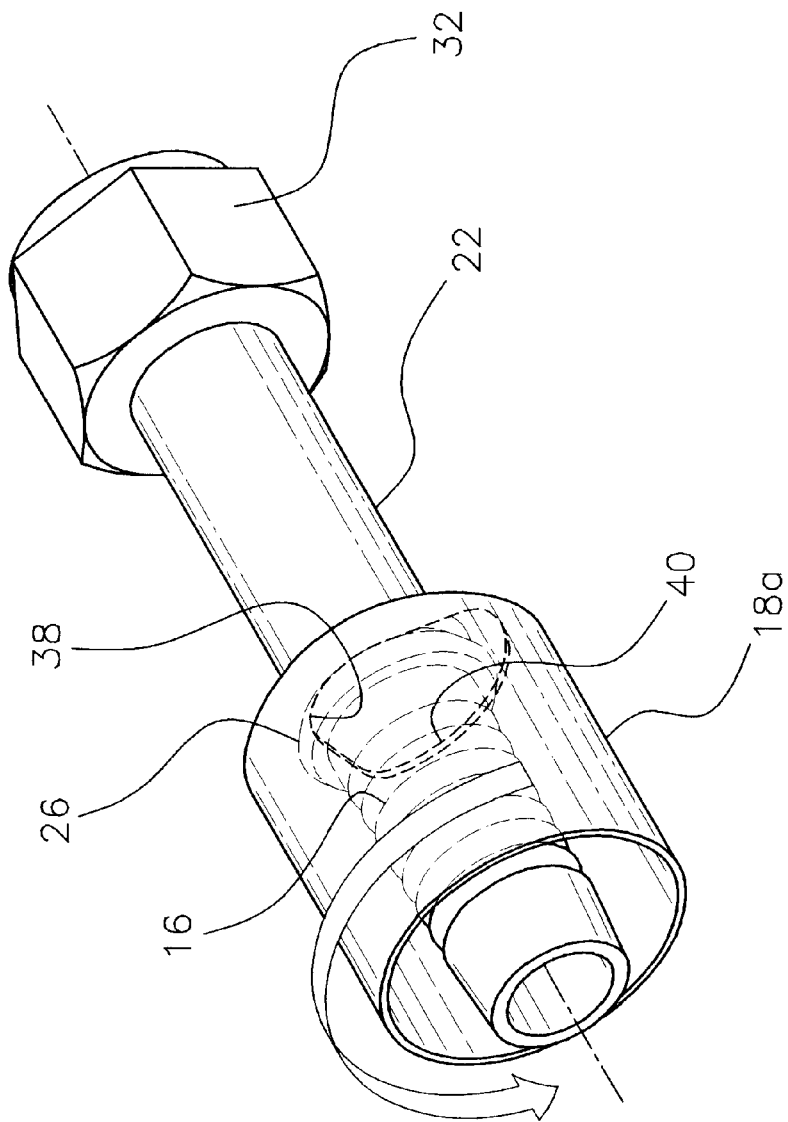
FIG. 6 is a perspective view of the third step of the repair method.

As in the prior art, the inventive steps begin with cutting away the old ferrule 12 by making a cut 34 in ferrule 12 as seen in FIG. 4. Thereafter, the inventive steps deviate from the prior art as seen in FIG. 3. A new ferrule 18A is provided with an oval opening 36 at a first end. The oval opening 36 has a narrow first arc 38 and broader second arc 40. Arc 40 permits sufficient space for the ferrule 18A to be slipped over the first flange 26, between first flange 26 and second flange 28 as seen in FIG. 5. The ferrule 18A, as seen in FIG. 6, is turned so that the smaller arc 38 wedges into groove 30 and maintains the ferrule 18A in a fixed centered axial position around the bead lock fitting 16.

Figure 7:
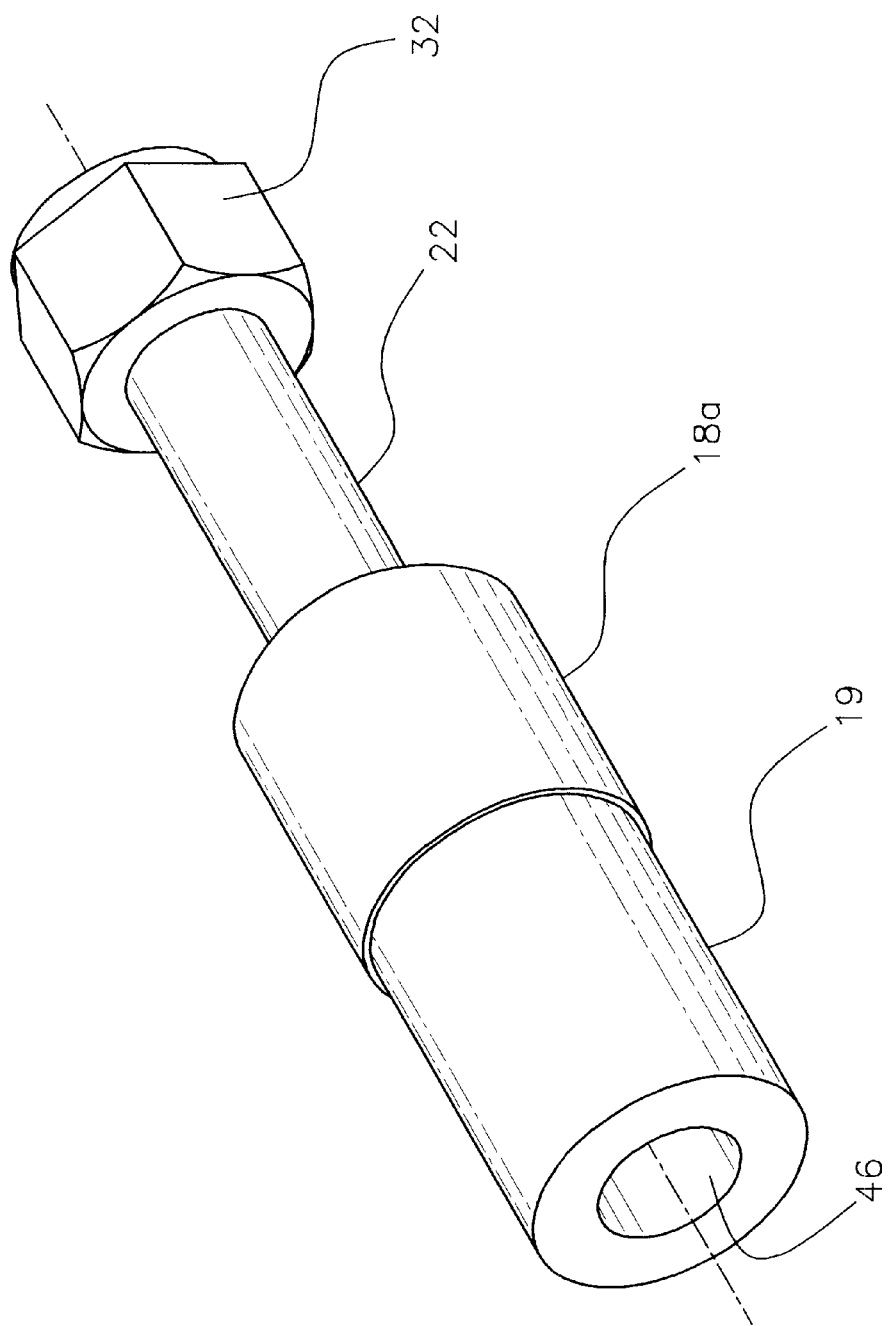
FIG. 7 is a perspective view of the ferrule in place over a new hose.
Figure 8:
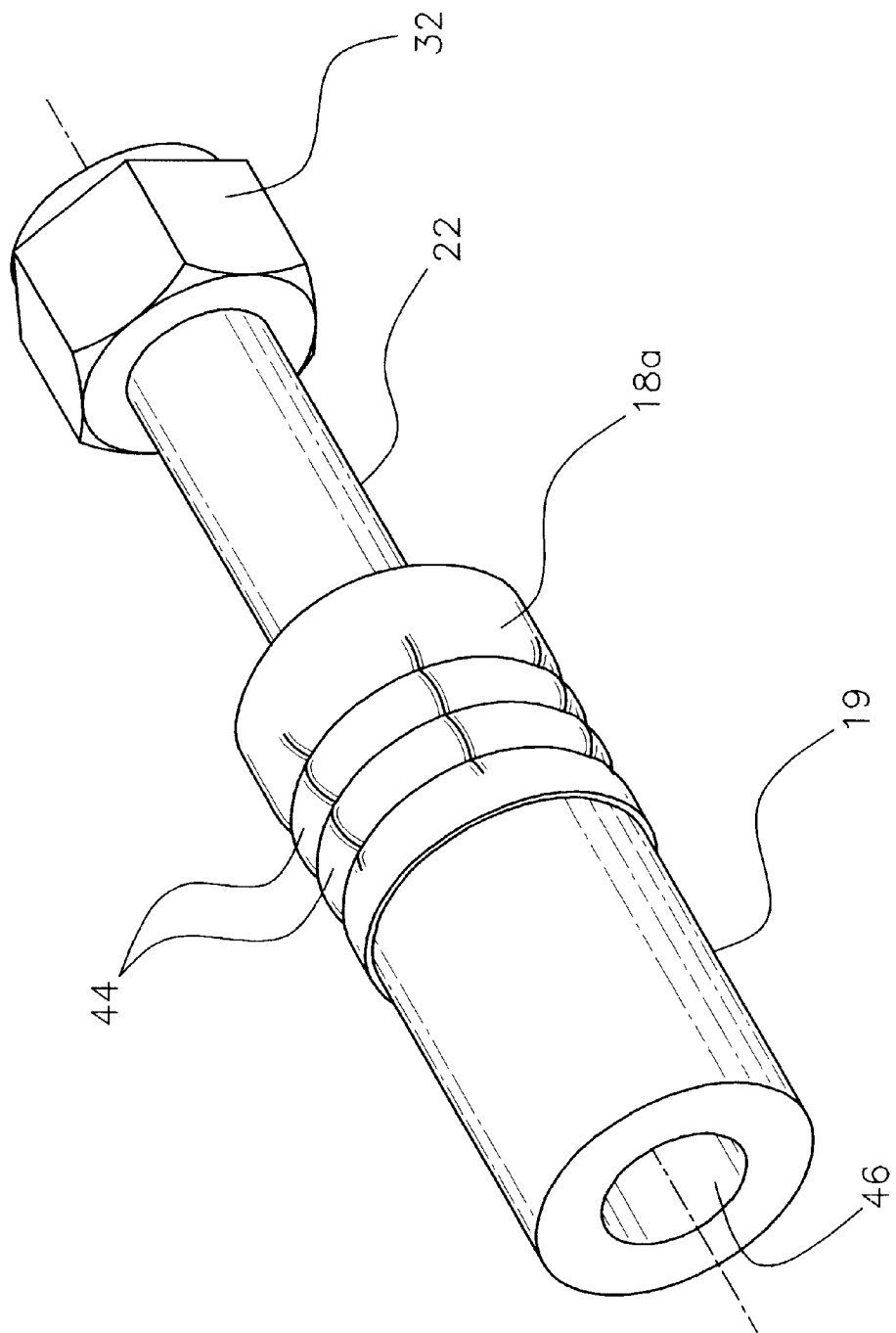
FIG. 8 is a perspective view of the repaired hose assembly after the last crimping step of the repair method.

Thereafter, a new hose 19 is fitted over the bead lock fitting 16 as shown in FIG. 7. The ferrule 18A is then crimped 44 to retain hose 19 in position on the bead lock fitting 16 as shown in FIG. 8.

The bead lock fitting 16, together with shaft 22 is preferably made from aluminum. Alternatively, it could be a steel structure. The ferrule 18A can be any non-corrodible and crimpable metal such as steel or aluminum. The air conditioning hose 19 is a common elastomer used for air conditioning hoses. The hose has a nylon barrier interior coating 46 that can be damaged if the hose is forced onto a bead lock fitting. Thus the need for a crimping step instead of forcing the hose on the fitting. The inventive method permits rapid repair of air conditioning hose connections without damage to the coating 46 and without the need for restraining rings that could contaminate the hose connection to the ferrule 18A.

The above description has described specific method steps embodying the invention. However, it will be within one having skill in the art to make modifications without departing from the spirit and scope of the underlying concept of this method of repairing an air conditioning hose connection. The inventive concept is not limited to the steps described, but includes such modifications except as limited by the scope of the appended claims.

Having thus described the invention, what is claimed and desired to be secured by Letters Patent is:

1. A method of repairing a leaking air conditioning hose assembly, the steps comprising:
    (a) cutting an old ferrule lengthwise and removing the old ferrule and an old hose from a bead lock fitting;
    (b) providing a new ferrule having an oval opening at one end of sufficient diameter to pass over a first annular flange on the bead lock fitting;
    (c) axially mounting the new ferrule over the bead lock fitting with the oval opening positioned between the first annular flange and a second annular flange adjacent the first annular flange, in a groove formed between the first and second annular flange;
    (d) turning the new ferrule with an edge of the oval opening positioned in the groove so that a smaller arc portion of the oval opening wedges into the groove to maintain the new ferrule in a locked position around the bead lock fitting;

(e) providing a new air conditioning hose and inserting the new air-conditioning hose axially between an inner wall of the new ferrule and a top surface of the bead lock fitting; and (f) crimping the new ferrule to permanently retain the air conditioning hose between the new ferrule inner wall and a top surface of the bead lock fitting.

2. A method of repairing an air conditioning hose assembly, the steps comprising:

(a) cutting an old ferrule lengthwise and removing the old ferrule and an old hose from a bead lock fitting;

(b) providing a new ferrule having an opening at one end of sufficient diameter to pass over a first annular flange on the bead lock fitting;

(c) cutting an arc in an edge of the opening, the arc having a diminished diameter conforming to the diameter of a groove formed between the first annular flange and a second adjacent annular flange;

(d) turning the new ferrule so that the edge of the opening containing the arc with the diminished diameter is wedged in the groove so that the ferrule will be held in an axially configuration around the bead lock fitting;

(e) providing a new air conditioning hose and inserting the new air-conditioning hose axially between an inner wall of the new ferrule and a top surface of the bead lock fitting; and (f) crimping the new ferrule to permanently retain the air conditioning hose between the new ferrule inner wall and a top surface of the bead lock fitting.

3. A method of repairing an air-conditioning hose assembly, the steps comprising:

(a) cutting an old ferrule lengthwise and removing the old ferrule and an old hose from a bead lock fitting;

(b) providing a new ferrule having an opening at one end with a diameter sufficient to pass over a first annular flange on the bead lock fitting, the opening having an irregular edge with an arc of the edge conforming to an arc of a groove formed between the first annular flange and a second adjacent annular flange;

(c) axially mounting the new ferrule over the bead lock fitting and turning the new ferrule so that the arc of the edge conforming to the arc of the groove is wedged into the groove;

(d) providing a new air conditioning hose and inserting the new air conditioning hose axially between an inner wall of the new ferrule and a top surface of the bead lock fitting, and;

(e) crimping the new ferrule to permanently retain the air conditioning hose between the new ferrule inner wall and a top surface of the bead lock fitting.

* * * * *